(12) United States Patent
Velke

(10) Patent No.: US 7,240,662 B1
(45) Date of Patent: Jul. 10, 2007

(54) METHOD AND DEVICE TO IMPROVE COMBUSTION EFFICIENCY OF A FUEL INJECTED INTERNAL COMBUSTION ENGINE

(76) Inventor: William H. Velke, P.O. Box 154, 277 Campbellville Road, Campbellville, Ontario (CA) L0P 1B0

( * ) Notice: Subject to any disclaimer, the term of this patent is extended or adjusted under 35 U.S.C. 154(b) by 0 days.

(21) Appl. No.: 11/354,043

(22) Filed: Feb. 15, 2006

(51) Int. Cl.
*F02M 15/00* (2006.01)

(52) U.S. Cl. ........................ 123/305; 123/557
(58) Field of Classification Search ............... 123/1 A, 123/541, 557, 558, 41.31, 41.1, 514, 305
See application file for complete search history.

(56) References Cited

U.S. PATENT DOCUMENTS

| | | | | |
|---|---|---|---|---|
| 3,799,125 A | * | 3/1974 | Hutchinson | 123/3 |
| 4,059,076 A | * | 11/1977 | Kosaka et al. | 123/3 |
| 4,072,138 A | * | 2/1978 | Hawkins et al. | 123/552 |
| 4,522,158 A | * | 6/1985 | Wisegerber | 123/1 A |
| 5,174,266 A | * | 12/1992 | Evdokimo | 123/557 |
| 5,218,944 A | * | 6/1993 | Leonard | 123/557 |
| 5,662,090 A | * | 9/1997 | Ward | 123/557 |
| 5,806,502 A | * | 9/1998 | Thomas et al. | 123/557 |
| 5,964,206 A | * | 10/1999 | White et al. | 123/541 |
| 6,729,310 B2 | * | 5/2004 | Ekstam | 123/516 |
| 7,028,672 B2 | * | 4/2006 | Glenz et al. | 123/514 |
| 2005/0279334 A1 | * | 12/2005 | Lerner | 123/557 |

\* cited by examiner

*Primary Examiner*—Hai Huynh

(57) ABSTRACT

An effective method and most compact device for easy installation and simple operation with all existing automobile aftermarket fuel injected engines, which method and device improves fuel condition without vaporization and increases engine performance while significantly reducing fuel consumption and harmful exhaust emissions, especially $CO_2$.

7 Claims, 3 Drawing Sheets

Fig. 1  Prior Art Fuel Supply System
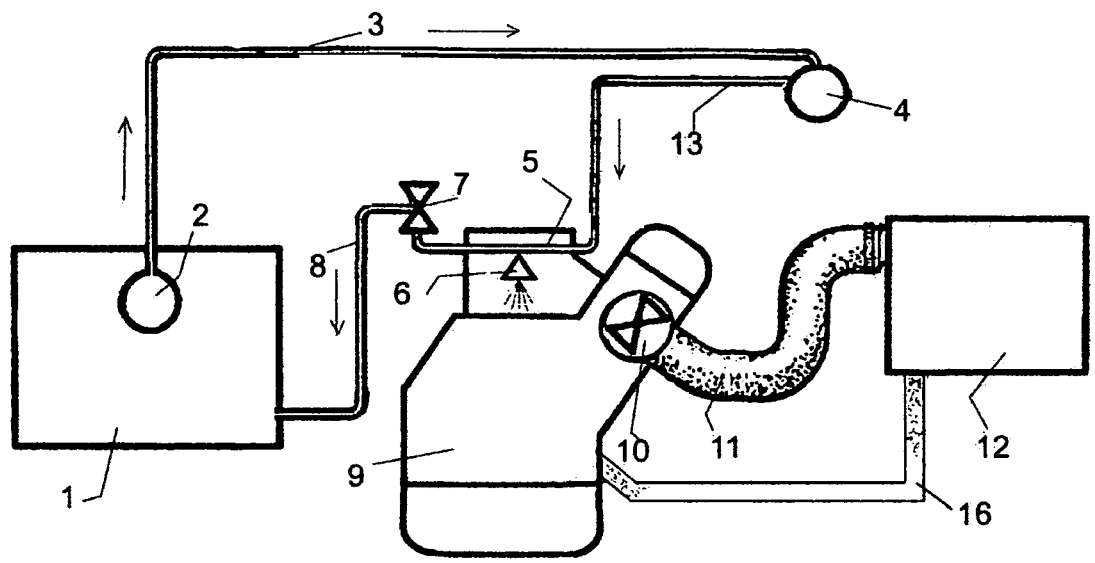
Fig. 2
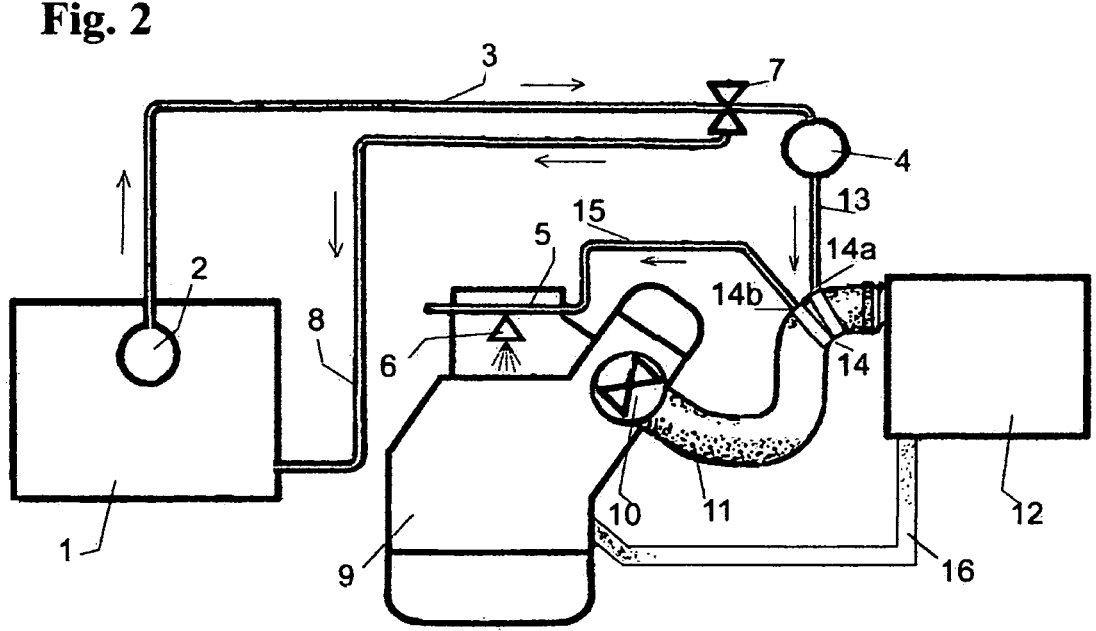

METHOD AND DEVICE TO IMPROVE COMBUSTION EFFICIENCY OF A FUEL INJECTED INTERNAL COMBUSTION ENGINE

BACKGROUND OF THE INVENTION

The field of invention relates to a safe method and compact device for efficient conversion of gasoline into energy with a fuel injected internal combustion engine. It is the object of the invention to provide a device which will fit into an existing automobile engine compartment and functions according to a method which first turbulates and then preheats a liquid fuel to a constant maximum operating temperature level without causing premature vaporisation.

Contrary to the operation of carburated engines, a fuel injection system provides a predetermined volume of gasoline under predetermined fuel delivery pressure, sufficient to force the fuel through the injector jets for combustion in the engine.

The vast difference in mode of operation between a fuel injected and carburated engine must be understood when reviewing this invention.

A large number of methods and devices known in prior art operate specifically with carburated internal combustion engines, converting a liquid fuel into its vaporous state prior to its delivery to the carburetor, before mixing with combustion air and subsequent ignition.

Extensive research and testing has established that premature vaporisation of a liquid fuel during the combustion process in a typical automobile engine may actually be detrimental to the efficient combustion and conversion of gasoline into rotational energy, unless major alterations to the physical layout and operating method of the engine are effected.

Between 1900 and 1997, numerous US Patents were issued for methods and devices which operate to preheat a fuel in carburetion systems specifically for the purpose of causing fuel vaporisation prior to the fuel and combustion air mixing stage. It is now understood that preheating the fuel to its vaporisation level at such early stage of the combustion process is not practical because of other serious problems which may result, such as vapour lock or premature ignition and detonation. In fuel injection systems, because of the high fuel pressure required to operate the system, the fuel is not able to vaporise as readily, and if vaporisation would occur prior to fuel injection, the system would also be unable to operate efficiently.

Other inventions have been disclosed which accommodate special fuel temperature level requirements, but may still be operating in a very inefficient manor. In U.S. Pat. No. 4,403,590, Davis discloses a system to preheat gasoline below its vaporisation temperature, but the system works only in conjunction with a certain additive combined with the combustion air. Davis discloses a system operating to maintain the fuel temperature for a carburated engine at a range of between 115 and 130 F by opening or closing a valve, which supplies cooling fluid from the engine cooling system to a special reservoir. The claimed coolant temperature range is 130 to 225 degrees F., while the preferred operating temperature range is 140 degrees F. The gasoline is circulated through the reservoir by way of a fuel line in heat transfer relation with the engine cooling fluid, and the gasoline is prevented from evaporating by inducing additional pressure in the fuel line. The device disclosed by Davis provides a very inefficient and cumbersome operating system, usable only with carburated combustion engines.

In U.S. Pat. No. 5,218,944, Leonard discloses a fuel preheating device for a fuel injected system, which is operated with engine coolant. However, as Leonard refers to means to maintain a certain fuel temperature at a level which prevents fuel from vaporising, he does not disclose or claim any fuel temperature range or specific fuel operating temperature level at which his method is required to function. Therefore, Leonard discloses insufficient information when describing his invention for someone to understand all the required functions and to make effective use thereof. This of course is contrary to established US Patent Rules. Furthermore, Leonard discloses a large fuel preheat unit connected to a cumbersome computerised circuitry and monitoring system to constantly report on a number of engine components and functions in order for his method to operate. The computer system and device disclosed by Leonard is therefore also contrary to the invention disclosed herein.

It is the object of this invention to provide a simple and effective combustion efficiency method and device of sufficient compactness and ease of operation as to be fitted into all engine compartments of today's existing fuel injected automobile engines. No prior art is known which provides such an efficient method or compact device.

SUMMARY OF THE INVENTION

Gasoline consists of a mixture of volatile hydrocarbons suitable for operating an internal combustion engine. The major fuel components are usually hydrocarbons with boiling points ranging from below 100 F to 392 F at ambient pressure conditions, all with a common auto-ignition temperature of more or less 495 degrees Fahrenheit.

When a gasoline supply system operates under pressure, vaporisation occurs at much higher temperatures. As all fuel injection system operate under pressure, fuel may be sufficiently preheated to increase combustion efficiency without causing fuel vaporisation. Temperatures above the normal boiling point of the azeotrope at about 100 F, depending of course on the variety of components of the gasoline mixture being used to establish desired octane ratings, may effectively be employed. Therefore, if sufficient fuel pressure is applied in an air tight fuel delivery system, a temperature range from 100 F up to 225 F may be especially useful. It is understood that a higher fuel temperature results in greater efficiency increases, because a gasoline mixture is most valuable when every molecule of the mixture is at its most excited and volatile stage when it is being injected into the engine. It is also well understood that the higher the fuel temperature level above 125 F, the more complete combustion, better mileage (MPG), and less exhaust pollution is obtained. But care must be taken to hold the fuel temperature preferably around a steady 200 F in order to most safely operate an efficient fuel injection system. It must always be realised that the danger of explosion of fuel, prior to its mixing with air for combustion, is increased as the fuel operating temperature reaches 225 F and beyond.

Today's car engines are exclusively operating with fuel injection systems. Such fuel injection systems employ a fuel delivery pressure of as high as 40 psi, or higher, and includes a fuel bypass provision, which, depending on engine requirements, returns any non-injected fuel to the fuel tank of the vehicle.

Fuel injected car engines operate with an engine coolant temperature of about 225 F, and because of the high fuel delivery pressure, such coolant temperature level is suitable to transfer sufficient heat to the fuel in order to raise fuel temperature to an advantageous level without causing premature vaporisation. The engine temperature is controlled by way of a coolant fluid thermostat reaction, set at about 175 F in the summer and 195 F in the winter.

The invention disclosed herein operates on the principle that by first turbulating then preheating the fuel of a fuel injected combustion engine to its most ideal operating temperature level, and without changing the fuel from its liquid to a gaseous or vaporised state prior to injection into the engine, a significant reduction in fuel consumption and harmful emissions may be achieved. It is of great importance however that any device operating according to the invention be very compact in size and uncomplicated in its operation, so that it may be suitable for installation in the confined spaces of engine compartments of existing motor vehicles, especially for aftermarket application.

Even though a high fuel delivery pressure is used to operate a fuel injection system, existing poor fuel structure conditions prior to injection, incomplete and inefficient fuel combustion and other inherent automotive operating problems, result in limited conversion of thermal energy into mechanical energy in almost all of today's automobiles. If an engine is out of tune or badly worn, conversion efficiency may drop even to below 15%. It therefore stands to reason that any method and device which provides combustion efficiency improvements of up to 50% with simple installation and at reasonable cost is most desirable.

The method and device disclosed herein is able to increase thermal efficiency in a fuel injected combustion engine through the following method.

1) The device firstly provides an improved fuel structure for delivery to the injector by turbulating the fluid fuel mixture, allowing more complete fuel conversion.
2) The device secondly delivers such improved turbulated fluid structure to the injector in a more volatile condition, facilitating greater use and conversion, especially of the heavier components of the gasoline which contain most of the energy.
3) The device thirdly reduces the size of fuel vapour droplets at fuel injection and during the compression stroke of the fuel and combustion air mixture, thereby converting a large part of the fuel which is normally lost as part of the exhaust emission in the form of unburned hydrocarbons.
4) The device fourthly increases the volume and flow speed of the fuel, while maintaining its mass in its increased liquid volume, which improves the overall combustion kinetics and hence significantly increases the total combustion efficiency and energy conversion ratio.

During the four distinct improvement stages of the method of this invention, the device and its components are able to significantly increase the performance efficiency of all fuel injected internal combustion engines by reducing fuel consumption and harmful exhaust emissions, especially CO2 greenhouse gases, by as much as up to 50%.

Depending on weather conditions and time of year, the operating temperature of gasoline supplied from the gas tank to the engine of an automobile may differ by more than 100 degrees Fahrenheit. It is obvious that such large fuel temperature variation impacts the operation and efficiency level of the combustion process of all present engines.

The disclosed invention therefore provides a method and device functioning specifically with fuel injected engines, which is able to create and maintain a continuous and most ideal fuel operating structure and condition at all times, allowing little or no variation in the optimum fuel injection temperature, regardless of environmental conditions, and without requiring any computerised control or operating system.

One of the efficiency improvements activated by the device is the "turbulation" of the fuel mixture, which provides the following significant advantage. It is understood that a turbulated operating fluid, when in a heat transfer relation with a second operating medium, will transfer heat to or from such second operating medium at a ratio of at least 2 to 1 over non-turbulated fluids. If in fact the second operating medium is a fluid as well, its turbulation together with the turbulated first operating fluid will provide a heat transfer rate increase of at least 4 to 1 over the heat transfer ratio between non-turbulated fluids.

Another efficiency improvement activated by the device is the change of fuel structure to a more advantageous operating volume at increased flow speed. It is understood that every 5 degrees F. of increase in fuel temperature will increase fuel volume and flow speed by 1% without changing fuel mass. Therefore, especially in cold climate conditions, elevating fuel temperature from 25 degrees F. to 225 degrees F. alone will increase fuel volume by at least 40%, which would significantly improve fuel operating condition.

It is further understood that, when increasing fuel volume through preheating, the actual increase in fuel volume is achieved through an increase in the velocity of molecular activities in the fuel structure, which, during the mixing of fuel with combustion air results in a more complete juncture of fuel molecules with oxygen molecules (faster moving fuel molecules find and combine more often with slower moving oxygen molecules). The device disclosed in this invention thereby facilitates a more efficient and complete fuel oxidation process and hence provides significant increases in fuel conversion and combustion efficiency.

A further efficiency improvement activated by the device is the change in fuel condition to a more "volatile but still safe operating structure". The fuel is preheated to a peak maintainable temperature, regardless of environmental or other detrimentally influential operating conditions, and such peak performance temperature and fuel structure is maintained without changing the fuel from its liquid state to a gaseous state, or causing vaporisation prior to injection into the engine for combustion. Because of the higher than ambient pressure required to deliver fuel to the injection system, significantly higher fuel temperatures may be employed without resulting in premature vaporisation, and without causing vapour lock or premature ignition or detonation.

As a general guide, the following optimal fuel temperature levels may be co-related to specific fuel operating pressures in a confined fuel delivery conduit system:

A fuel operating temperature range of 85 to 100 degrees F. may be applicable with a fuel supply pressure condition of 25 psi and higher.

A fuel operating temperature range of 100 to 125 degrees F. may be applicable with a fuel supply pressure condition of 30 psi and higher.

A fuel operating temperature range of 125 to 150 degrees F. may be applicable with a fuel supply pressure condition of 35 psi and higher.

A fuel operating temperature range of 150 to 175 degrees F. may be applicable with a fuel supply pressure condition of 40 psi and higher.

A fuel operating temperature range of 175 to 200 degrees F. may be applicable with a fuel supply pressure condition of 45 psi and higher.

A fuel operating temperature range of 200 to 225 degrees F. may be applicable with a fuel supply pressure condition of 50 psi and higher.

Engine operating tests, using up-to-date dynamometer equipment with Government approved emission calculating provisions, demonstrate and confirm a reduction in unburned hydrocarbons when increasing fuel temperature from 70 F to 110 F. A fuel temperature increase of 40 degrees F. over ambient therefore provides improvements as follows:

at engine curb idle, a reduction of 27% of unburned hydrocarbons, at 40 km per hour, a reduction of 10% of unburned hydrocarbons.

This translates directly into a significant reduction of fuel consumption, or increase of combustion efficiency and fuel conversion improvement at the cited ratios.

The tests also indicate that it is a requirement to disengage any fuel pressure regulator located at the end of the fuel rail, and to replace it with an inline fuel pressure regulator, preferably with means to adjust the fuel pressure range, located ahead of the fuel rail and in fact ahead of the fuel heat exchanger. This provision would allow excess ambient temperature fuel rather than heated fuel to be returned to the fuel tank, thereby maintaining a more stable and continuous higher temperature flow of fuel supply to the fuel rail and injectors, while maintaining a safe ambient fuel temperature in the tank without requiring any additional fuel cooling system.

All prior art fuel injected combustion engines operate as follows. Fuel is pumped from fuel tank 1 by way of fuel pump 2 through fuel line 3 under a specified psi level of operating pressure, and is routed via fuel filter 4 to fuel rail 5 for injection into the engine at injector 6. Any of the pressurised fuel not injected is routed back to the fuel tank via pressure relief valve 7 located at the end of the fuel rail, and which valve opens into to fuel return line 8.

In order to significantly and safely improve combustion efficiency and fuel conversion ratio, the device claimed in this disclosure operates under the following claimed method. Fuel is pumped from fuel tank 1 by way of fuel pump 2 through fuel line 3 under its specified level of operating pressure, and is routed to fuel filter 4. Beyond fuel filter 4, fuel flow is divided and routed firstly via fuel line 13a through heat exchanger 14 to fuel rail 5 via fuel line 15 for injection into the engine at injector 6, and unheated fuel is routed secondly via fuel line 13b to pressure relief valve 16 which is located at the end of the fuel rail 5 and is designed to open in unison with the general fuel pressure relief valve 7 which is also located at the end of the fuel rail 5. As the fuel operating pressure at this location reaches identical levels for both valves, both should open at the same time if valves with identical operating parameters are used. However, depending on general operating conditions, it may be advantageous to install valve 16 with a slightly lower pressure response, so that it may open just seconds before valve 7 As the fuel flow through the heat exchanger assembly is subject to a certain amount of flow restriction, whenever valve 16 opens fuel flow speed through fuel line 13b will increase over fuel flow speed through line 13a, and hence significantly more unheated fuel over heated fuel will flow past pressure relief valve 7 into fuel by-pass line 8 for return to fuel tank 1. This of course prevents undue accumulation of high temperature fuel in the fuel tank to any dangerous level, especially during hot climate conditions.

The secondary pressure relief valve 16 may also be located beyond valve 7 leading into fuel line 8, and as such, when pressure reduction is called for, will satisfied the requirement more rapidly with more unheated fuel being returned to the fuel tank via return line 8.

The upper temperature limit for preheating fuel according to this method is easily controlled. As the fuel heat exchanger assembly draws its heat from the engine coolant liquid, fuel temperature is more or less limited by the engine thermostat 10 and its temperature rating, which may reach from 175 degrees to 195 degrees Fahrenheit, depending on engine specifications. Because the cold fuel will assist in cooling the temperature of the coolant passing through or adjacent the heat exchanger, a thermostat with a setting higher than 195 F may be appropriate without causing harm to the engine. This in turn would result in coolant exiting the engine at thermostat 10 at a temperature level above 195 degrees Fahrenheit, allowing a more compact heat exchanger assembly to be employed, which of course is one of the important objects of the present invention.

More detailed functions and features of the method and device of the present invention are disclosed in the following descriptions.

BRIEF DESCRIPTION OF THE DRAWINGS

The disclosed illustrations of the invention demonstrate the compactness, economical installation and ease of operation of a typical preferred embodiment of the invention.

In FIG. 1 is illustrated a view of the components of a prior art combustion system in a typical automobile equipped with a fuel injection engine, without incorporating any means for the method and operation of the device of the present invention.

In FIG. 2 is illustrated a view of the components of a combustion system in a typical automobile equipped with a fuel injection engine, but this time incorporating the means for the method and operation of the device of the present invention.

DETAILED DESCRIPTION OF THE DRAWINGS

Figure 3:
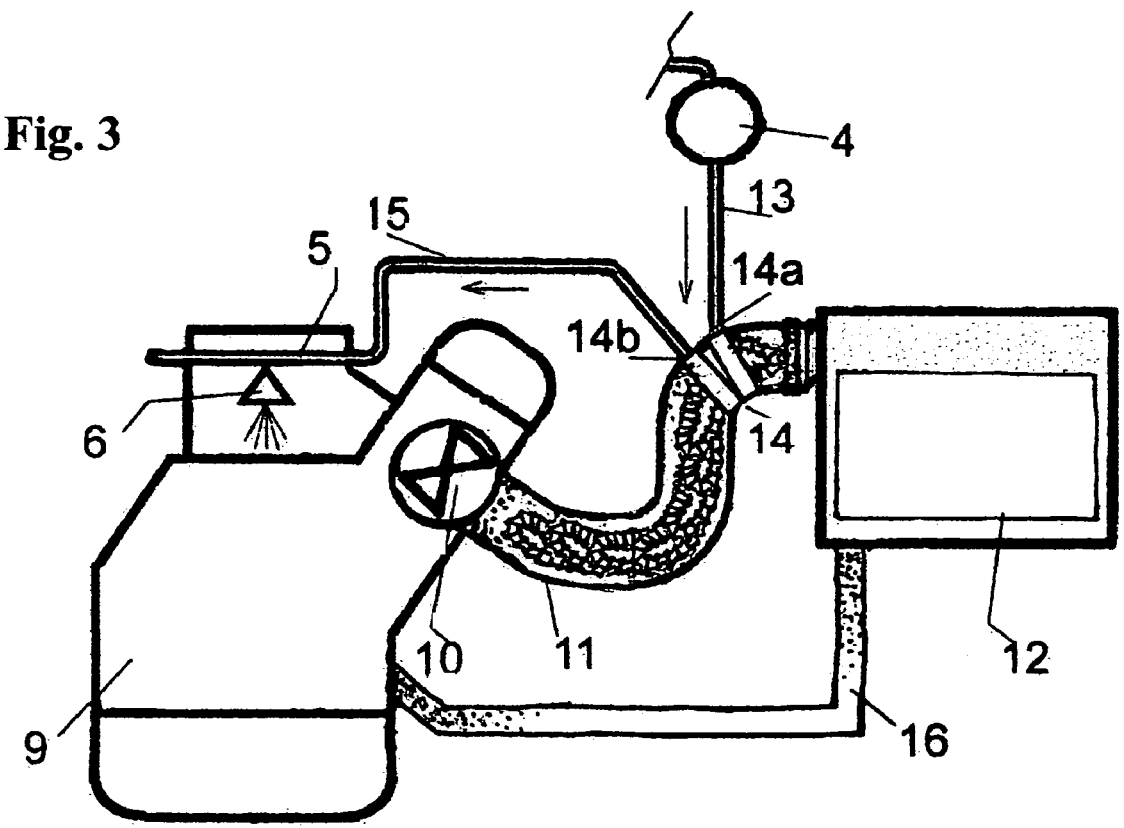
In FIG. 3 is illustrated a preferred fuel preheating device consisting of a coiled corrugated stainless steel fuel line located in a heat transfer relation with the cooling fluid of the engine.

FIG. 1 illustrates the various components and their sequence of operation for a typical prior art fuel injected internal combustion engine. From fuel tank 1 fuel is routed through line 3 via fuel pump 2 under a specified psi pressure to fuel filter 4. Fuel filter 4 separates any fuel imperfections, and through line 13 fuel is routed further to fuel rail 5. The fuel injectors 6 are located in fuel rail 5 through which the fuel is injected into the combustion areas of engine 9. In accordance with the operation of the engine and the fuel volume requirement, any fuel which is not injected during the operation is returned to fuel tank 1 through return fuel line 8 via pressure relief valve 7, which responds to the pressure rise of the unused fuel collected at the end of fuel rail 5. During the combustion of the fuel and its conversion to a rotational force, a large amount of heat is produced, which needs to be controlled and reduced. Cooling fluid circulates through the engine and is routed to radiator 12 through radiator hose 11 for cooling. Cooling thermostat 10 operates to control the flow of the cooling liquid and opens and closes in accordance with its specified operating setting. Coolant return line 16 returns the cooling fluid from the radiator 12 to engine block 9.

FIG. 2 illustrates the alteration of components required to operate a typical fuel injected internal combustion engine in accordance with the basic method and device of the present invention. From fuel tank 1 fuel is routed through line 3 via fuel pump 2 under a specified psi pressure to fuel filter 4. Before reaching fuel filter 4, a fuel regulator 7 is now located at an advanced location to provide the necessary means to return excess fuel to the tank via return fuel line 8, thereby delivering only the portion of fuel to the fuel rail of the engine which will be actually consumed by the engine. Fuel filter 4 separates any fuel imperfections, and fuel delivery is now routed via fuel line 13 through fuel heat transfer assembly 14 equipped with inlet 14a and outlet 14b. Fuel line 15 connects to fuel line outlet 14b and supplies heated fuel to fuel rail 5 for injection into the engine through fuel injectors 6. Cooling fluid circulates through the engine block and is routed to radiator 12 through radiator hose 11 and returned through line 16 to the engine block for cooling. A portion of the fuel supply conduit is designed to operate as an efficient heat transfer assembly 14 which is in heat transfer relation with the engine cooling fluid, providing sufficient fuel surface exposure to the cooling fluid in order to transfer heat to the fuel passing through assembly 14 to a maximum operating temperature level in accordance with the specified operating fuel pressure psi for the engine. The cooling fluid temperature is controlled through engine coolant thermostat 10 and maintains the coolant fluid at a standard maximum temperature level of 225 F to provide safe transfer of heat to the fuel, up to its highest safe temperature level of 220 degrees Fahrenheit.

FIG. 3 illustrates a preferred device functioning as a compact fuel turbulating heat transfer assembly 14 consisting of flat coiled corrugated stainless steel tubing with its radiator hose installation fuel inlet 14a and fuel outlet 14b. This assembly is designed to fit inside most standard prior art radiator hose configurations without requiring additional engine compartment space. This application may be especially suitable where the engine is equipped with a somewhat shorter radiator hose and/or a hose of smaller diameter. The coiled corrugated tubing is plyable and will fit inside any shape and configuration of existing radiator hoses. The corrugation of the tube provides following additional major operating advantages. It firstly turbulates the fuel passing through the tubing such that more of the fuel makes contact with the interior surface of the tubing which significantly increases the heat transfer ratio from the engine coolant to the fuel. It further provides at least twice the tube surface area per tube length, compared to regular plain tubing, which is all in effective heat transfer relation with the hot coolant liquid in which it is immersed or adjacent to. Therefore, all surface areas of the tube are thereby equally arranged in heat transfer relation with the hot fluid, contrary to a plain tube or coil configuration of which only half of the tube is in actual effective heat transfer contact with the adjacent fluid. When considering all such aspects, a heat exchanger assembly as shown in FIG. 3, and it being the length of 18 inches, will provide the identical heat transfer efficiency as that of a 144 inches long coil of plain tubing. The reasoning is as follows, the 18 inch heat exchanger 14 consists of 36 inches of corrugated tubing. 36 inches of corrugated tubing provides more or less the same surface area as that of a 72 inch non-corrugated tube of similar diameter, and, as the tube is immersed, twice as much surface area is making actual contact with the heating fluid compared to a plain tube coil, and therefore provides the effect and efficiency of a 144 inch long non-corrugated coiled tube. It is therefore obvious that this type of heat exchanger assembly is most effective in both providing superior heat transfer efficiency as well as providing the desired and required compactness of a heat transfer assembly for placement and installation in all automotive aftermarket applications.

Figure 4:
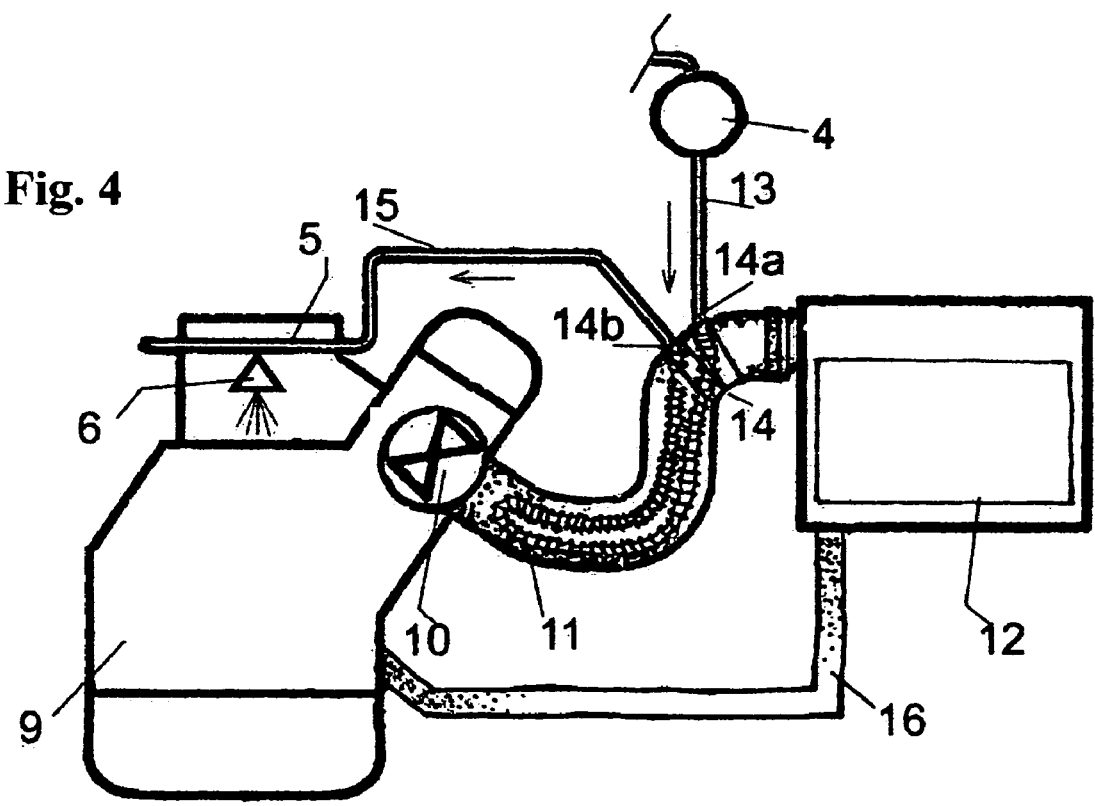
In FIG. 4 is illustrated a further view of the preferred fuel preheating device, this time indicating how a straight corrugated stainless steel fuel line may be placed to fit the interior of the radiator hose of the engine.

FIG. 4 illustrates a further preferred device functioning as a compact fuel turbulating heat transfer assembly 14 consisting of straight corrugated stainless steel tubing with its radiator hose installation fuel inlet 14a and fuel outlet 14b. This assembly is designed this time to fit only inside the radiator hose configurations of a fuel injected engine without requiring additional engine compartment space. This application may be especially suitable where the engine is equipped with a radiator hose of sufficient length.

Figure 5:
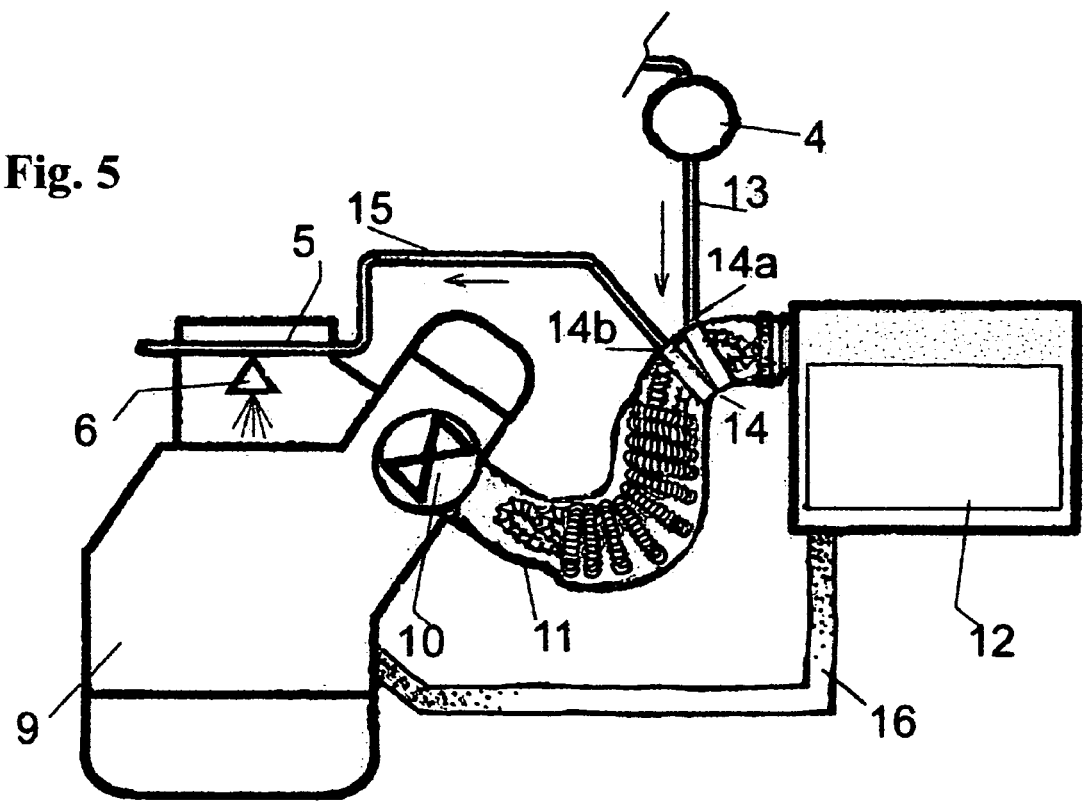
In FIG. 5 is illustrated a further view of a fuel preheating device, this time indicating how the coiled corrugated stainless steel fuel line may be placed to fit the interior of an enlarged or added radiator hose portion of the engine cooling system.

FIG. 5 illustrates another preferred device functioning as a compact fuel turbulating heat transfer assembly 14 consisting of a coiled corrugated stainless steel tubing within its enlarged or added radiator hose configuration, including installation fuel inlet 14a and fuel outlet 14b. This assembly is designed this time to fit as part of the radiator coolant hose configuration of all fuel injected engines without requiring substantial additional engine compartment space.

Figure 6:
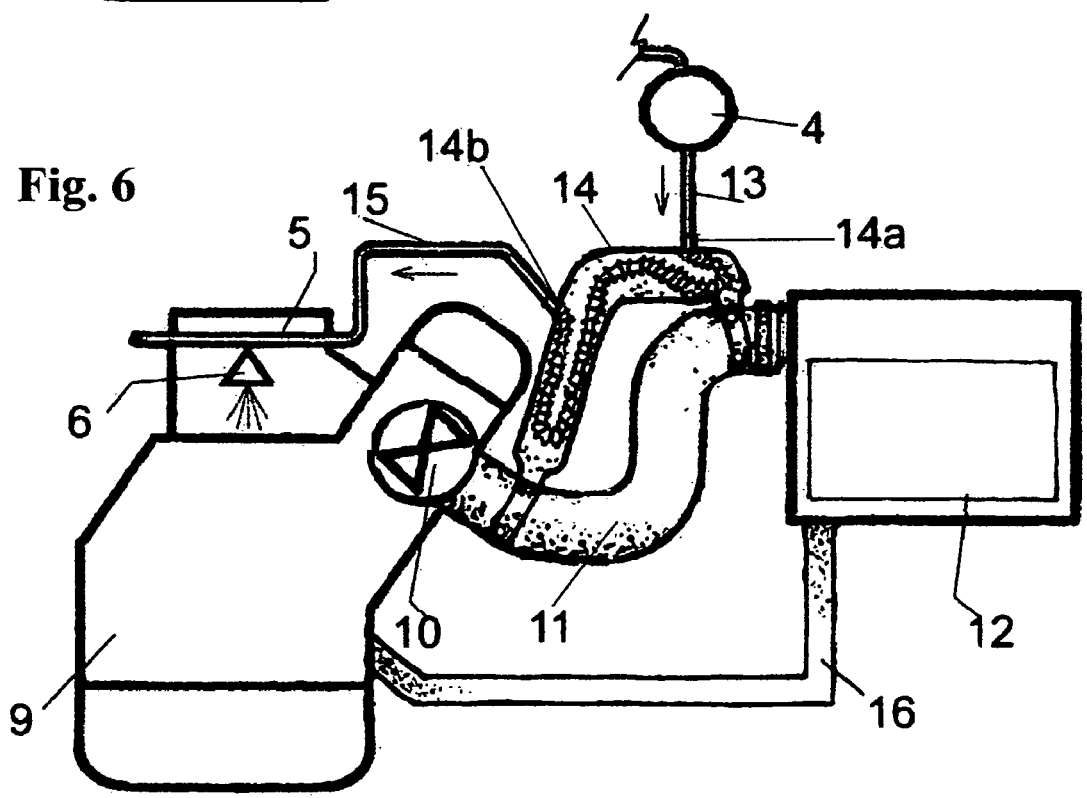
In FIG. 6 is illustrated a fuel preheating device, this time incorporating a corrugated stainless steel fuel line in heat transfer relation with the cooling fluid by way of a system addition.

FIG. 6 illustrates a further alternative to a preferred device functioning as a fuel turbulating heat transfer assembly consisting of corrugated stainless steel tubing with its fuel inlet connection 14a and fuel outlet 14b now being part of a cooling fluid extension or addition. This assembly is again designed to fit as part of said cooling fluid upper radhose system or addition 14. This application may be suitable where the radiator hose is unsuitable to accommodate a required heat transfer assembly installation within an existing portion of a hose configuration.

I herewith claim the following:

1. A method to improve the kinetics and fuel efficiency of the combustion process in a fuel injected internal combustion engine, resulting in the reduction of fuel consumption and harmful emissions while maintaining performance of the engine, comprising:
    a) providing a constant volume of liquid hydrocarbon fuel from the fuel tank to the fuel rail and injectors of said fuel injected engine;
    b) maintaining said volume of liquid fuel for delivery to said injectors under an operating pressure between 25 and 60 psi, or as specified for each engine;
    c) directing said pressurised liquid fuel through a primary fuel supply conduit defining a heat exchange assembly that extends through a heating zone within the engine cooling system, having a fuel inlet and outlet;
    d) providing a fuel pressure relief valve located ahead of said heat exchange assembly and ahead of the fuel rail, rather than beyond the fuel rail, operational to return excess fuel unheated to the fuel tank;
    e) increasing the flow speed and volatility of said constant volume of pressurised liquid fuel by turbulating and heating the fuel in said heat exchange assembly to an optimal operating temperature in accordance with the following parameters:

for fuel supplied at a pressure condition of 25 psi or higher, heat the fuel to an operating temperature range of 85 to 130 degrees F:

for fuel supplied at a pressure condition of 30 psi or higher, heat the fuel to an operating temperature range of 85 to 160 degrees F:

for fuel supplied at a pressure condition of 35 psi or higher, heat the fuel to an operating temperature range of 85 to 190 degrees F:

for fuel supplied at a pressure condition of 40 psi or higher, heat the fuel to an operating temperature range of 85 to 220 degrees F:

f) maintaining the temperature of the pressurised liquid turbulated fuel at its most optimal operating level without causing vaporisation of the heated liquid fuel prior to injection into the engine.

2. A method in accordance with claim 1, wherein the pressurized liquid fuel is turbulated by directing it through a fuel conduit defining a heat exchange assembly formed from corrugated stainless steel tubing.

3. A method in accordance with claim 1, wherein the pressurized liquid fuel is efficiently heated in said heat exchange assembly formed from corrugated stainless steel tubing, which provides a significant increase in fuel surface area to effect most efficient heat transfer.

4. A method in accordance with claim 1, wherein the heat exchange assembly transfers heat to the fuel from a source other than the cooling system of the engine.

5. A device for improving the kinetics and combustion efficiency of a fuel injected internal combustion engine, operating with liquid hydrocarbon fuel and providing a reduction of fuel consumption and harmful emissions, especially HC unburned hydrocarbons, while maintaining performance output of said internal combustion engine, comprising:

a) a fuel supply conduit defining a compact and efficient heat exchange assembly for the conveyance for a constant volume of pressurized liquid hydrocarbon fuel to the injectors of a fuel injected combustion engine;

b) a heat exchange assembly of corrugated stainless steel tubing of sufficient diameter to comply with fuel pressure and volume delivery specifications, designed to fit in a heating zone of the engine cooling system without requiring undue space inside the engine compartment;

c) sufficient length of said corrugated stainless steel tubing to be able to turbulate the fuel flow and to provide efficient heat transfer from the coolant fluid to the fuel prior to combustion in the engine under the following conditions:

for fuel supplied at a pressure condition of 25 psi or higher, able to heat the fuel to an operating temperature range of 85 to 130 degrees F:

for fuel supplied at a pressure condition of 30 psi or higher, able to heat the fuel to an operating temperature range of 85 to 160 degrees F:

for fuel supplied at a pressure condition of 35 psi or higher, able to heat the fuel to an operating temperature range of 85 to 190 degrees F:

for fuel supplied at a pressure condition of 40 psi or higher, able to heat the fuel to an operating temperature range of 85 to 220 degrees F:

d) a heat exchange assembly which increases the flow velocity and volatility of said constant volume of pressurized turbulated liquid fuel by heating said turbulated fuel in said heat exchange assembly to its most optimal operating temperature without causing a change of fuel consistency from liquid to vapor prior to the injection stage.

6. A device in accordance with claim 5, wherein the fuel conduit formed from corrugated stainless steel tubing, defining said heat exchange assembly, provides between twice to four times the heat transfer efficiency compared to plain tubing of similar diameter transporting unturbulated fuel.

7. A device in accordance with claim 6, wherein the heat exchange assembly is located adjacent or within a heating zone other than that of the engine cooling system.

* * * * *